United States Patent [19]

Nobileau

[11] Patent Number: 4,793,754

[45] Date of Patent: Dec. 27, 1988

[54] PROCESS FOR LOCKING TWO SCREWED ELEMENTS AND ELEMENTS FOR CARRYING OUT THIS PROCESS

[75] Inventor: Philippe Nobileau, Saint-Germain-E-Laye, France

[73] Assignee: Vetco Gray Inc., Houston, Tex.

[21] Appl. No.: 511,205

[22] Filed: Jul. 6, 1983

[30] Foreign Application Priority Data

Jul. 7, 1982 [FR] France .................. 82 11939

[51] Int. Cl.⁴ ............................................. F16B 39/32
[52] U.S. Cl. ...................... 411/186; 411/326
[58] Field of Search ............. 411/122, 123, 124, 136, 411/138, 141, 145, 184, 185, 186, 187, 326, 327, 333, 334, 335, 336, 276, 277, 281, 282, 283, 284, 285, 290, 291

[56] References Cited

U.S. PATENT DOCUMENTS

| | | |
|---|---|---|
| 90,699 | 6/1869 | Steward . |
| 448,165 | 3/1891 | Robison . |
| 831,602 | 9/1906 | Cookerley .................. 411/335 |
| 845,243 | 2/1907 | Lilley . |
| 860,393 | 7/1907 | Lees . |
| 946,154 | 1/1910 | Reinoehl et al. ............. 411/335 |
| 947,680 | 1/1910 | Hord ........................... 411/186 |
| 1,069,916 | 8/1913 | Windsor . |
| 1,195,350 | 8/1916 | Gilman . |
| 1,196,565 | 8/1916 | McDonald ................... 411/184 |
| 1,374,054 | 4/1921 | Bridge ......................... 411/124 |
| 1,956,745 | 5/1934 | Payne .......................... 411/186 |
| 2,006,461 | 7/1935 | Kramer ........................ 411/277 |
| 2,007,293 | 7/1935 | Cayoueme .................... 411/285 |
| 2,239,942 | 4/1941 | Stone ........................... 285/146 |
| 3,066,959 | 12/1962 | White . |
| 3,240,513 | 3/1966 | Turzillo . |
| 4,347,025 | 8/1982 | Long ............................ 411/201 |

FOREIGN PATENT DOCUMENTS

| | | |
|---|---|---|
| 628915 | 4/1936 | Fed. Rep. of Germany . |
| 701558 | 12/1940 | Fed. Rep. of Germany . |
| 506986 | 11/1967 | France . |
| 7280 | 5/1889 | United Kingdom ........... 411/277 |
| 9563 | of 1904 | United Kingdom ........... 411/283 |
| 569250 | 5/1945 | United Kingdom . |
| 804798 | 5/1955 | United Kingdom . |
| 897572 | 5/1960 | United Kingdom . |
| 2064041 | 11/1980 | United Kingdom . |

Primary Examiner—Richard E. Moore
Assistant Examiner—Rodney M. Lindsey
Attorney, Agent, or Firm—Cushman, Darby & Cushman

[57] ABSTRACT

A process for mutually locking two elements screwed on one another, wherein it is provided that a portion of one of the elements covers a housing provided in the other element and overlaps an edge limiting said housing; said portion or a part thereof is then sheared level with said edge so that it penetrates in the housing, the shearing front then cooperating with the wall of the housing comprising the edge to form a stop opposing unscrewing. The process is more particularly applicable to the connecting of tubes used in offshore oil drilling and prospection.

2 Claims, 1 Drawing Sheet

PROCESS FOR LOCKING TWO SCREWED ELEMENTS AND ELEMENTS FOR CARRYING OUT THIS PROCESS

The present invention relates to a process for locking two screwed elements, to the elements and to a device for carrying out this process.

Most screwed assemblies impose an initial pre-stress guaranteeing good holding of the assembly when it is subjected to stress during operation. However, to prevent a possible loosening (rendered possible when the stress during operation exceeds the tightening pre-stress or in the case of vibration, beating, ...), it is necessary to lock the two screwed elements together. This locking is effected in a known manner by various means having the function of creating a positive stop in reference to mutual rotation of the two elements. To this end, a piece added to one of the elements of the assembly, and made fast in rotation with the latter, may be used, which comprises a mobile or deformable element cooperating, after screwing, with the other element to form a stop against unscrewing. It is also known to create a permanent deformation of the two screwed elements to connect them in rotation (punching, etc. ...); certain of these locking means are disconnectable, others not.

It is an object of the present invention to provide a locking of which the principle consists in a permanent deformation of one of the elements (or of a portion thereof) to cooperate with a stop of the other provided a priori and which, before locking, does not interfere with the first element. A particularly advantageous application of the invention resides in the locking of connectors of pipes employed in oil drilling and prospection. These connectors are of large dimensions (up to about 80 cm diameter), which has guided the concept of the invention both concerning the process and the means necessary for carrying it out, none of the heretofore known devices being entirely satisfactory in any simple fashion in the dimensions in question.

To this end, the present invention firstly relates to a process for mutually locking two elements screwed on one another in a predetermined relative position corresponding in particular to obtaining a given tightening pre-stress.

According to the invention, it consists essentially in providing that a portion of one of the elements covers a housing provided in the other element and overlaps an edge limiting said housing, and in that said portion is sheared between an outer tool and said edge so that it penetrates in said housing, the shearing front cooperating with the wall of said housing terminated by the edge to form a stop opposing unscrewing.

The invention also relates to elements for assembly by screwing, in which one of the elements comprises a notch defined by an outer edge located on the surface of the element whilst the other element comprises a portion adapted to cover the notch, overlapping said edge, said portion being in one piece with said other element and formed by a band perpendicular to said edge.

In a first embodiment, the notch is made in the male element, whilst the band is cut out from the female element. In this way, either the edge is axial and said band is defined by two machinings perpendicular to the axis of the assembly of a skirt extending the female piece and covering said edge, or the edge is radial on a shoulder of the male piece and said portion is a flange of the female piece in which said band is defined by two concentric machinings.

One of the machinings limiting said band is advantageously constituted by the actual edge of the skirt or the flange mentioned above.

The invention will be more readily understood on reading the following description with reference to the accompanying drawings, in which.

Figure 1:
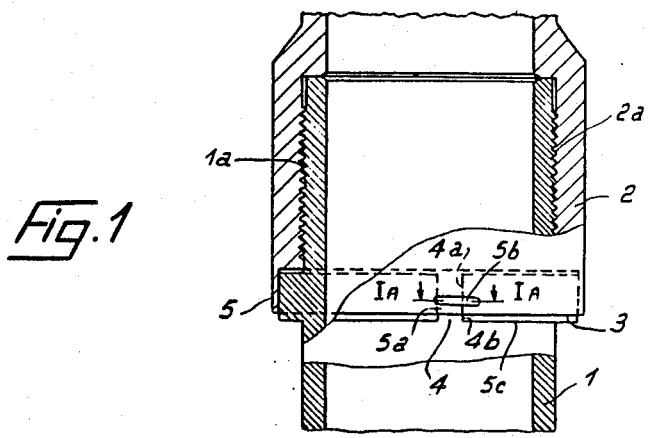
FIG. 1 is a schematic view of two elements screwed on one another provided with the means for carrying out the process according to the invention.
Figure 1A:
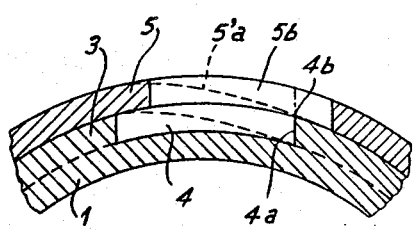
FIG. 1A is a partial view in section along line 1A of FIG. 1.

Referring now to the drawings, and firstly to FIGS. 1 and 1A, an element 1 is provided in its upper part with an outer thread 1a for connection with an element 2 comprising a corresponding inner thread 2a. At the base of the thread 1a, the element 1 comprises a shoulder 3 in the thickness of which and in the axial direction of the assembly, a housing 4 has been formed, for example by milling. This milling is laterally limited by at least one wall 4a of which the intersection with the outer surface of the shoulder 3 determines an edge 4b.

The element 2 is extended beyond its thread 2a by a skirt 5 covering at least partially the shoulder 3 and particularly the housing 4 by overlapping the edge 4b. The process according to the invention consists essentially in shearing the portion of skirt 5 located level with the edge 4b by means of an outside tool, said edge advantageously forming one of the "jaws" of the shear. By this operation, a shearing front is therefore created which is driven into the housing 4 and which cooperates intimately with the said wall 4a. This cooperation therefore forms a stop for locking the two elements against unscrewing.

To facilitate the shearing operation, a band shaped portion 5a will have been defined in the skirt 5 by means of two machinings (slots or the like) such as 5b whose length (angularly of the longitudinal axis of element 2, i.e. in the circumferential direction) is determined so that, at the end of tightening, the band thus defined overlaps the edge 4b. As shown in FIG. 1, the slot 5b initially is completely bounded by a perimetrical surface. It will have been noted that there are two slots hereinabove. The preferred embodiment of the invention is the one shown in FIG. 1 in which one of the slots does not exist. It is the lower edge 5c of the skirt 5 which performs the role of a slot. In this configuration, the skirt 5 covers the shoulder 3 only partially.

At 5'a, FIG. 1A shows the shape taken by the band 5a after shearing.

Figure 2:
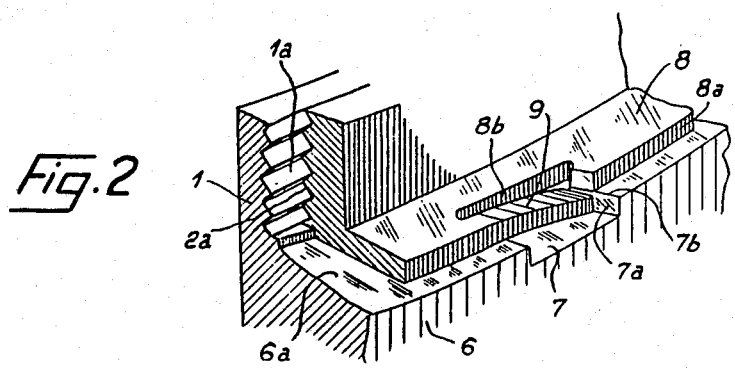
FIG. 2 is a partial view of another embodiment of the invention.

In FIG. 2, the element 1 possesses a shoulder 6 on the radial face 6a of which a groove 7 has been made. The female element 2 possesses a flange 8 in which a band 9 has been defined between the outer edge 8a and a slot 8b concentric to edge 8a. In this second embodiment also, the slot 8b is elongated angularly of the longitudinal axis of the element on which it is provided, and, initially, it is completely bounded by a perimetrical surface. At the end of tightening, said band overlaps the edge 7b formed by the intersection of a wall 7a of the groove 7 with the face 6a of the shoulder 6 at the level of which said shearing is effected. As in the preceding case, the shearing front constitutes with the wall 7a an assembly of locking stops opposing unscrewing of the assembly.

It should be noted that the length of the slot (5b or 8b) must be such, at a minimum, that, whatever the manufacturing and tightening tolerances of the assembly, it always overlaps the edge (4b or 7b) at the end of tightening. In addition, its length must also be determined so that, at the moment of shearing, the portion of band which bends is not too short, therefore too stiff for the shearing front to cooperate over the whole of its surface with the wall of the housing located beneath the edge.

Finally, it will be noted that it is simple to unlock the assembly by lifting the band (5a, 9) to extract it from the housing (4, 7).

The invention finds advantageous application in the domain of screwed fittings, particularly of large diameter.

It is not limited to the foregoing description but covers, on the contrary, all variants which may be made thereto without departing from the scope or spirit thereof.

What is claimed is:

1. A threaded connection integrally provided with an anti-unthreading lock,
    said threaded connection comprising:
    a first externally threaded connector;
    a second internally threaded connector;
    these two threaded connectors being constructed to be threadedly connected together until tight, and at such time to have means defining a surface portion of one of said connectors facially juxtaposed with means defining an angularly elongated slot formed in a marginal portion of the other of said connectors, near but spaced from an edge surface of the latter, said slot being bounded by a perimetrical surface.
    means defining a recess in said surface portion means, said recess opening toward said other connector between said slot and said edge surface and having a first at least generally radially extending, angularly facing stop shoulder oriented to cooperate with a lock tang having a second oppositely angularly facing stop shoulder when such a lock tang is field-formed on said other connector and deformed into interfering relation with said recess;
    said marginal portion of said other connector, between said slot and said edge surface being constructed and arranged to be field-sheared crosswise to form a locking tang bounded by said perimetrical surface of said slot, by said edge surface and by a sheared end surface providing said second angularly facing stop shoulder and to have such locking tang then deformed into said recess and said first and second stop shoulders thereby into locking engagement.

2. The threaded connection of claim 1, wherein:
    said slot is longer, measured angularly of said other connector than the comparable dimension of said recess, measured angularly of said one connector to said first stop shoulder.

* * * * *